US012657594B2

(12) United States Patent
Beilis et al.

(10) Patent No.: US 12,657,594 B2
(45) Date of Patent: *Jun. 16, 2026

(54) SYSTEMS AND METHODS FOR PROVIDING USER EMOTION INFORMATION TO A CUSTOMER SERVICE PROVIDER

(71) Applicant: Capital One Services, LLC, McLean, VA (US)

(72) Inventors: David Beilis, Vaughan (CA); Mohammad Nejad-Sattary, Richmond Hill (CA); Tony Tang, Richmond Hill (CA)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,930

(22) Filed: Oct. 10, 2023

(65) Prior Publication Data

US 2024/0046279 A1 Feb. 8, 2024

Related U.S. Application Data

(63) Continuation of application No. 16/913,939, filed on Jun. 26, 2020, now Pat. No. 11,816,678.

(51) Int. Cl.
| | |
|---|---|
| *G06Q 30/016* | (2023.01) |
| *G06F 18/21* | (2023.01) |
| *G06N 20/00* | (2019.01) |
| *G06Q 30/0282* | (2023.01) |
| *G06V 10/82* | (2022.01) |

(Continued)

(52) U.S. Cl.
CPC ......... *G06Q 30/016* (2013.01); *G06F 18/217* (2023.01); *G06N 20/00* (2019.01); *G06Q 30/0282* (2013.01); *G06V 10/82* (2022.01); *G06V 40/174* (2022.01);

(Continued)

(58) Field of Classification Search
CPC .............. G06Q 30/016; G06Q 30/0282; G06F 18/217; G06N 20/00; G06N 3/006; G06N 3/08; G06V 10/82; G06V 40/174; H04L 51/046; H04L 65/1069; H04L 67/306;

(Continued)

(56) References Cited

U.S. PATENT DOCUMENTS

| | | | |
|---|---|---|---|
| 8,438,590 B2 * | 5/2013 | Crenshaw .............. | H04H 60/33 |
| | | | 725/12 |
| 8,564,684 B2 | 10/2013 | Bai | |

(Continued)

*Primary Examiner* — Solomon G Bezuayehu
(74) *Attorney, Agent, or Firm* — Bookoff McAndrews, PLLC

(57) ABSTRACT

Systems and methods are disclosed providing user emotion information to a customer service provider. For example, a method may include: transmitting, to a user device over a communication network, application data enabling the user device to perform a functionality usable by a user of the user device, the user device including a camera; receiving, from the user device over the communication network, user feedback data indicative of a characteristic of image data of the user obtained by the camera during usage of the functionality by the user; inputting the value of the facial expression parameter into a machine learning model to determine an assessment of an emotional state of the user during the usage of the functionality; and providing the assessment to the customer service provider.

20 Claims, 5 Drawing Sheets

(51) Int. Cl.
| | |
|---|---|
| *G06V 40/16* | (2022.01) |
| *H04L 51/046* | (2022.01) |
| *H04L 65/1069* | (2022.01) |
| *H04L 67/306* | (2022.01) |

(52) U.S. Cl.
CPC ........ *H04L 51/046* (2013.01); *H04L 65/1069* (2013.01); *H04L 67/306* (2013.01)

(58) Field of Classification Search
CPC ......... H04L 51/10; H04L 51/18; H04L 67/04; H04L 67/10; H04L 67/14
See application file for complete search history.

(56) References Cited

U.S. PATENT DOCUMENTS

| | | | | |
|---|---|---|---|---|
| 9,077,699 | B1 | 7/2015 | James | |
| 9,100,685 | B2 | 8/2015 | Conrad et al. | |
| 9,681,186 | B2 | 6/2017 | Lehtiniemi et al. | |
| 10,170,101 | B2 * | 1/2019 | Carr | G10L 13/08 |
| 10,573,313 | B2 * | 2/2020 | Mishra | G06V 40/172 |
| 10,599,917 | B1 * | 3/2020 | Shaburov | G06Q 30/0281 |
| 11,483,618 | B2 * | 10/2022 | Knox | H04N 21/42203 |
| 12,469,483 | B1 * | 11/2025 | Tran | G10L 15/26 |
| 2003/0040963 | A1 * | 2/2003 | Kogler | G06Q 30/02 705/14.18 |
| 2009/0307325 | A1 * | 12/2009 | Szeto | H04L 51/04 715/752 |
| 2012/0222057 | A1 * | 8/2012 | Sadowsky | H04N 21/4223 725/10 |
| 2012/0293680 | A1 * | 11/2012 | Guan | H04N 23/90 348/222.1 |
| 2014/0081690 | A1 * | 3/2014 | Winters | G06Q 10/063114 705/7.15 |
| 2014/0115466 | A1 * | 4/2014 | Barak | G06F 3/0484 715/765 |
| 2015/0020086 | A1 * | 1/2015 | Chen | H04H 60/46 725/12 |
| 2015/0286858 | A1 * | 10/2015 | Shaburov | G06V 40/167 382/103 |
| 2016/0063874 | A1 * | 3/2016 | Czerwinski | G16H 50/20 434/236 |
| 2017/0032353 | A1 * | 2/2017 | Vadivel | G06Q 20/40 |
| 2017/0220570 | A1 | 8/2017 | Tilaye et al. | |
| 2017/0353605 | A1 * | 12/2017 | Dumaine | G06V 40/176 |
| 2017/0374488 | A1 * | 12/2017 | Ward | H04W 68/005 |
| 2018/0077095 | A1 * | 3/2018 | Deyle | G06T 13/205 |
| 2018/0084022 | A1 * | 3/2018 | Newell | H04N 21/252 |
| 2019/0014378 | A1 * | 1/2019 | Shah | H04N 21/47217 |
| 2019/0172462 | A1 * | 6/2019 | Mishra | B60W 50/10 |
| 2019/0220922 | A1 * | 7/2019 | Barkas | G06Q 40/02 |
| 2019/0266999 | A1 * | 8/2019 | Chandrasekaran | G06F 3/167 |
| 2019/0318355 | A1 * | 10/2019 | Chopra | G06Q 20/28 |
| 2020/0005784 | A1 * | 1/2020 | Vadackupurath Mani | G06V 40/20 |
| 2020/0118686 | A1 * | 4/2020 | Jooste | G16H 20/10 |
| 2020/0160385 | A1 * | 5/2020 | Chan | G06Q 30/0255 |
| 2020/0213254 | A1 * | 7/2020 | Nigam | G06Q 10/10 |
| 2020/0214612 | A1 * | 7/2020 | Liu | G06F 3/015 |
| 2020/0279553 | A1 * | 9/2020 | McDuff | G10L 25/78 |
| 2020/0304450 | A1 * | 9/2020 | Daniali | H04L 51/56 |
| 2020/0350057 | A1 * | 11/2020 | El Kaliouby | G16H 40/67 |
| 2020/0351550 | A1 * | 11/2020 | Korupolu | H04N 21/4667 |
| 2020/0410391 | A1 * | 12/2020 | Barrett | G06N 5/04 |
| 2020/0413138 | A1 * | 12/2020 | Graf | G06N 3/09 |
| 2021/0046638 | A1 * | 2/2021 | Moon | B25J 9/163 |
| 2021/0073525 | A1 * | 3/2021 | Weinzaepfel | G06F 18/2411 |
| 2021/0166089 | A1 * | 6/2021 | Yun | G06F 18/251 |
| 2021/0248656 | A1 * | 8/2021 | Makowsky | G06Q 30/0621 |
| 2021/0258424 | A1 * | 8/2021 | Brown | H04M 3/5175 |
| 2021/0271866 | A1 * | 9/2021 | Hayakawa | G06V 40/103 |
| 2021/0280322 | A1 * | 9/2021 | Frank | A61B 5/6803 |
| 2021/0399911 | A1 * | 12/2021 | Jorasch | H04L 12/1818 |
| 2021/0407527 | A1 * | 12/2021 | Deole | G06Q 30/016 |
| 2022/0229488 | A1 * | 7/2022 | Akimoto | G06V 40/174 |
| 2022/0392625 | A1 | 12/2022 | Allen et al. | |

* cited by examiner

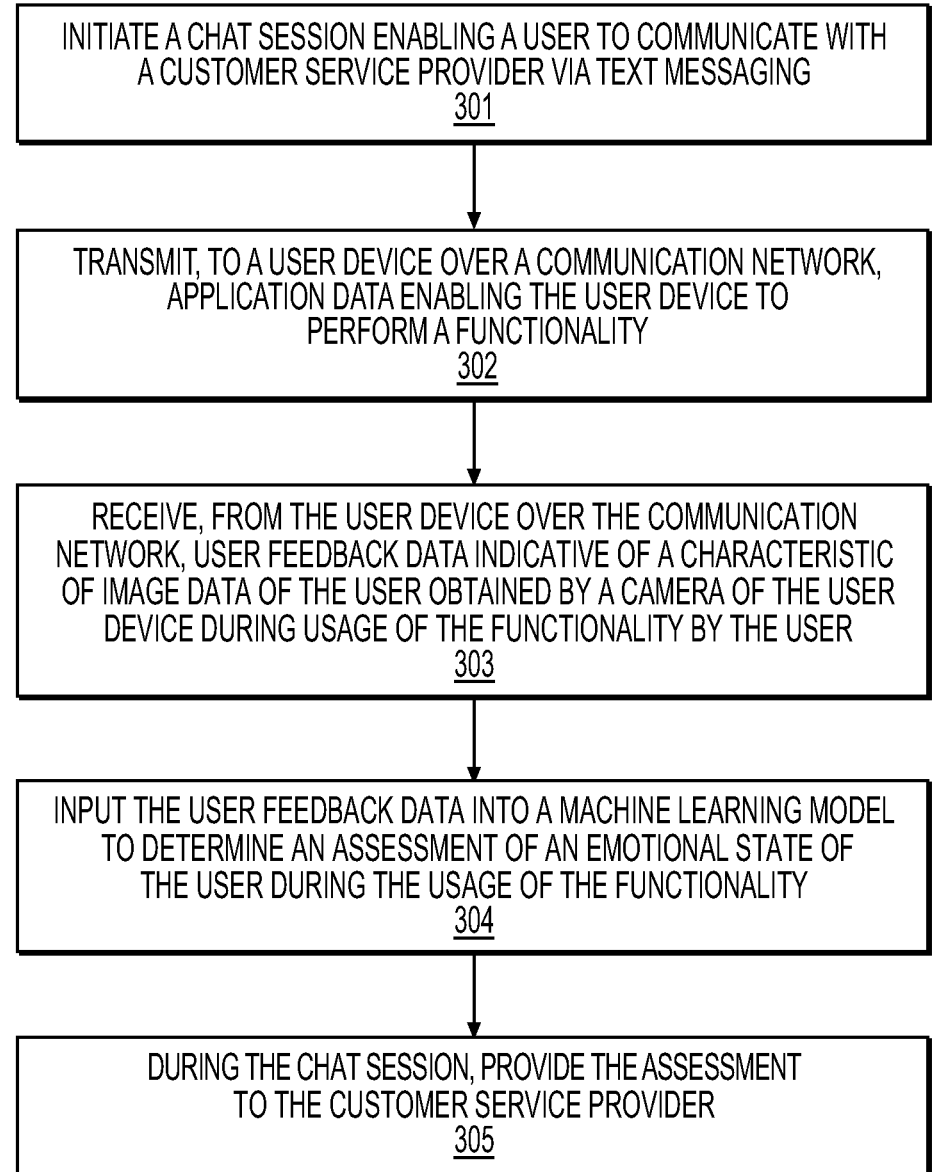

INITIATE A CHAT SESSION ENABLING A USER TO COMMUNICATE WITH
A CUSTOMER SERVICE PROVIDER VIA TEXT MESSAGING
301

TRANSMIT, TO A USER DEVICE OVER A COMMUNICATION NETWORK,
APPLICATION DATA ENABLING THE USER DEVICE TO
PERFORM A FUNCTIONALITY
302

RECEIVE, FROM THE USER DEVICE OVER THE COMMUNICATION
NETWORK, USER FEEDBACK DATA INDICATIVE OF A CHARACTERISTIC
OF IMAGE DATA OF THE USER OBTAINED BY A CAMERA OF THE USER
DEVICE DURING USAGE OF THE FUNCTIONALITY BY THE USER
303

INPUT THE USER FEEDBACK DATA INTO A MACHINE LEARNING MODEL
TO DETERMINE AN ASSESSMENT OF AN EMOTIONAL STATE OF
THE USER DURING THE USAGE OF THE FUNCTIONALITY
304

DURING THE CHAT SESSION, PROVIDE THE ASSESSMENT
TO THE CUSTOMER SERVICE PROVIDER
305

*FIG. 3*

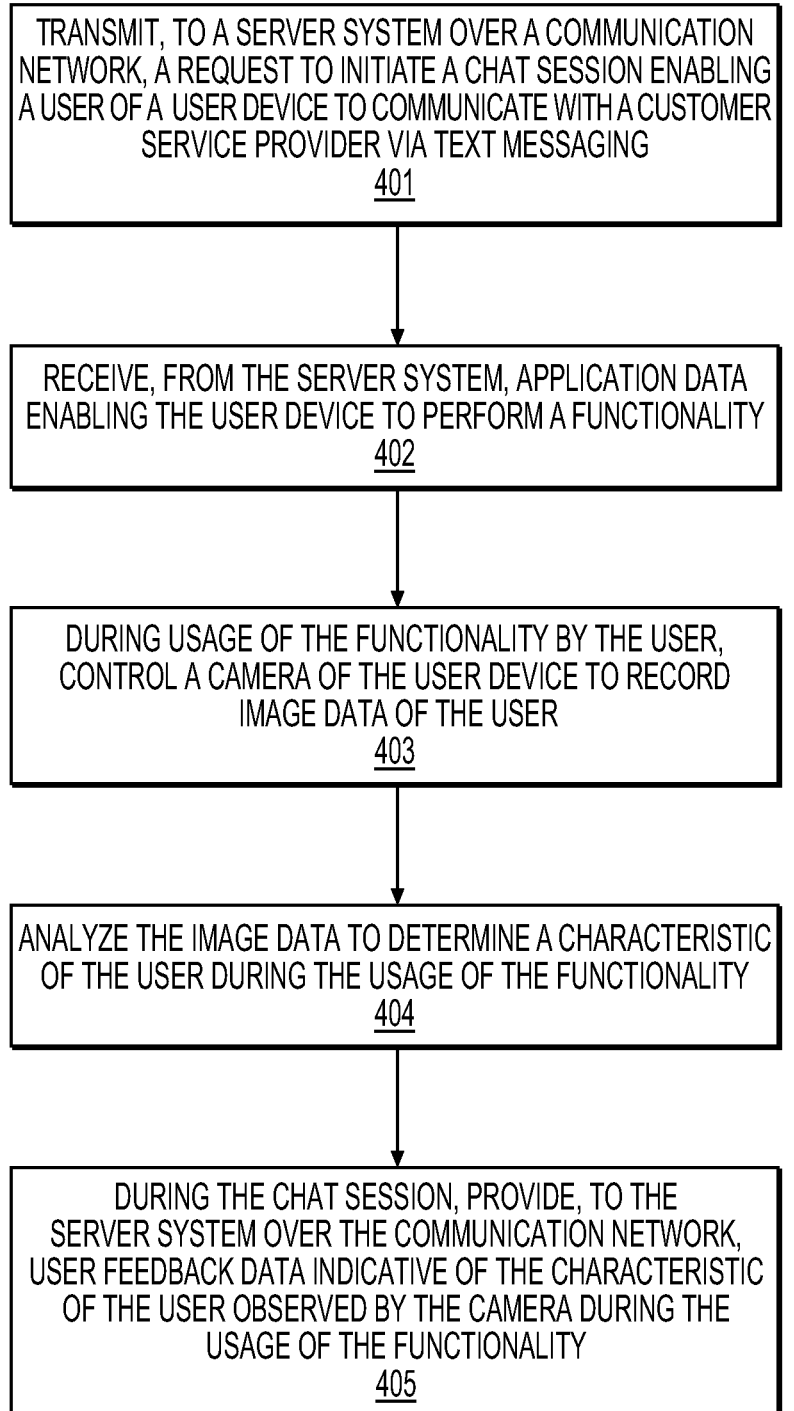

TRANSMIT, TO A SERVER SYSTEM OVER A COMMUNICATION NETWORK, A REQUEST TO INITIATE A CHAT SESSION ENABLING A USER OF A USER DEVICE TO COMMUNICATE WITH A CUSTOMER SERVICE PROVIDER VIA TEXT MESSAGING
401

RECEIVE, FROM THE SERVER SYSTEM, APPLICATION DATA ENABLING THE USER DEVICE TO PERFORM A FUNCTIONALITY
402

DURING USAGE OF THE FUNCTIONALITY BY THE USER, CONTROL A CAMERA OF THE USER DEVICE TO RECORD IMAGE DATA OF THE USER
403

ANALYZE THE IMAGE DATA TO DETERMINE A CHARACTERISTIC OF THE USER DURING THE USAGE OF THE FUNCTIONALITY
404

DURING THE CHAT SESSION, PROVIDE, TO THE SERVER SYSTEM OVER THE COMMUNICATION NETWORK, USER FEEDBACK DATA INDICATIVE OF THE CHARACTERISTIC OF THE USER OBSERVED BY THE CAMERA DURING THE USAGE OF THE FUNCTIONALITY
405

*FIG. 4*

SYSTEMS AND METHODS FOR PROVIDING USER EMOTION INFORMATION TO A CUSTOMER SERVICE PROVIDER

CROSS-REFERENCE TO RELATED APPLICATION(S)

This patent application is a continuation of, and claims the benefit of priority to, U.S. Nonprovisional patent application Ser. No. 16/913,939, filed on Jun. 26, 2020, the entirety of which is incorporated herein by reference.

TECHNICAL FIELD

Various embodiments of the present disclosure relate generally to computer-based determination of user emotions and using user emotion information to facilitate customer service.

BACKGROUND

When communicating with a customer by telephone or other voice-based communication method, a customer service agent may assess the emotional state of the customer through the customer's tone of voice. On the other hand, when communicating with a customer through text messaging without voice, the customer service agent is not able to utilize the customer's tone of voice. In such circumstances, it may be difficult for the customer service agent to determine the customer's emotional state, such as whether the customer is angry or happy, based solely on the text written by the customer. Therefore, there is a need for systems and methods to provide customer service agents with information pertaining to the emotions of a customer when communicating via text with the customer.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for providing user emotion information to a customer service provider.

For instance, a computer-implemented method may include: initiating a chat session enabling a user of a user device to communicate with the customer service provider via text messaging; transmitting, to the user device over a communication network, application data enabling the user device to perform a functionality, the user device including a camera; receiving, from the user device over the communication network, user feedback data indicative of a characteristic of image data of the user obtained by the camera during usage of the functionality by the user, the user feedback data including a value of a facial expression parameter, the value being indicative of a degree to which the user expresses an emotion associated with the facial expression parameter; inputting the value of the facial expression parameter into a machine learning model to determine an assessment of an emotional state of the user during the usage of the functionality; and during the chat session, providing the assessment to the customer service provider.

Furthermore, a non-transitory computer-readable medium may store instructions that, when executed by one or more processors of a user device, cause the user device to perform operations for tracking user emotion information. The operations may include: transmitting, to a server system, a request to initiate a chat session enabling a user of the user device to communicate with a customer service provider via text messaging; receiving, from the server system, application data enabling the user device to perform a functionality; during usage of the functionality by the user, controlling a camera of the user device to record image data of the user; analyzing the image data to determine a characteristic of the user during the usage of the functionality; and during the chat session, providing, to the server system over the communication network, user feedback data indicative of the characteristic of the user observed by the camera during the usage of the functionality, the user feedback data including a value of a facial expression parameter, the value being indicative of a degree to which the user expresses an emotion associated with the facial expression parameter.

Furthermore, a computer system may include a memory storing instructions; and one or more processors configured to execute the instructions to perform operations. The operations may include receiving, from a user device, a request to use the online service, the online service being configured to provide access to information of an account of a user of the user device; establishing, over a communication network, a data connection with the user device enabling an application executed on the user device to use the online service provided by the server system; providing the information of the account to the user device so that the information of the account is displayed on a display of the user device during usage of the online service by the user; receiving, from the user device over the communication network, user feedback data indicative of a characteristic of image data of the user obtained by a camera of the user device during the usage of the online service by the user; inputting the user feedback data into a machine learning model to determine an assessment of an emotional state of the user during the usage of the online service, the assessment being indicative of an emotion exhibited by the user in response to viewing the information of the account displayed on the user device; and providing the assessment to a customer service provider.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 is a flowchart illustrating a method for providing user emotion information to a customer service provider, according to one or more embodiments.

FIG. 4 is a flowchart illustrating another method for providing user emotion information to a customer service provider, according to one or more embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, a sensor of a user device, such as a camera of a smartphone, may gather image data of a user when the user is operating the user device. The user device may conduct preliminary analysis of the image data to generate user feedback data to a server system. The server system may analyze the user feedback data to determine an assessment of an emotional state of the user during the user's operation of the user device, and may then provide the determined assessment to a customer service provider. Accordingly, the customer service provider may utilize the assessment to determine the emotions of the user more easily, even if the customer service provider is communicating with the user by text messaging, and not by voice communication.

Figure 1:
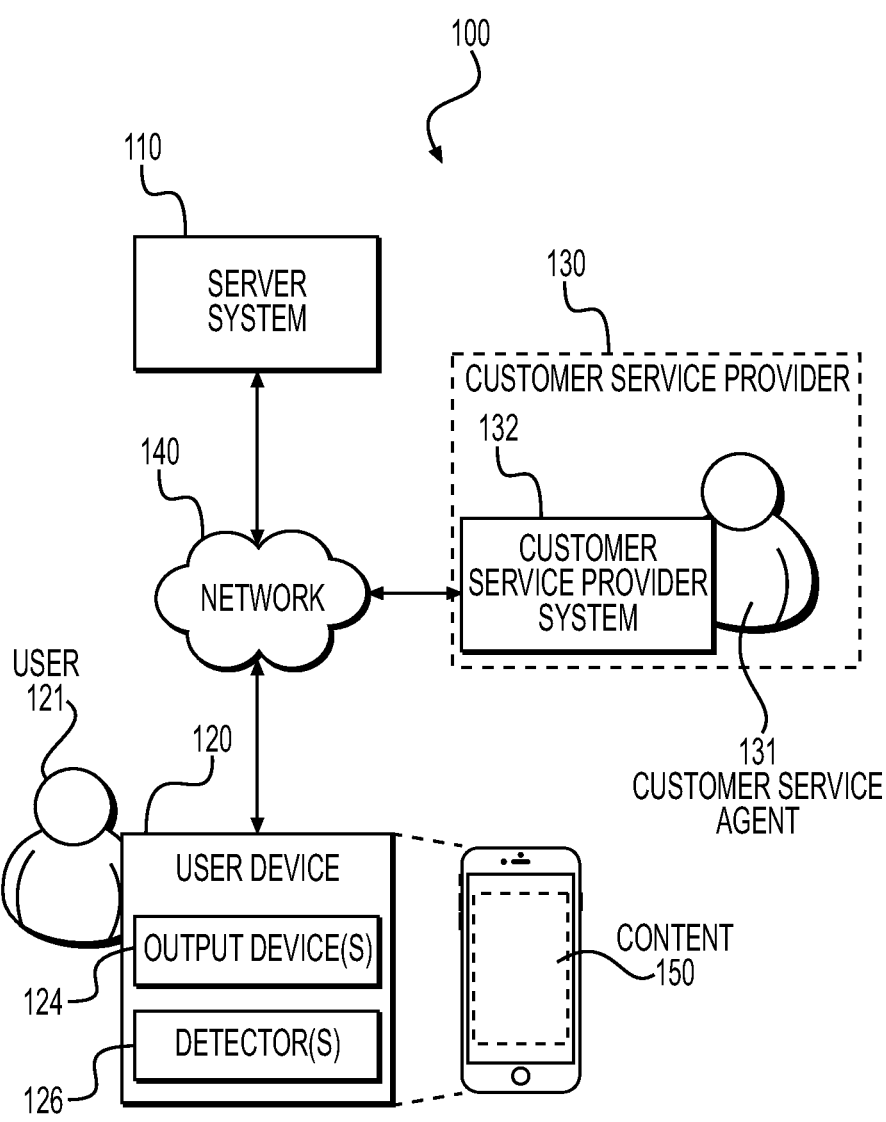
FIG. 1 depicts an exemplary system environment for providing user emotion information to a customer service provider, according to one or more embodiments.

FIG. 1 depicts a system environment 100 according to one or more embodiments. System environment 100 may include a server system 110, a user device 120 operated by a user 121, and a customer service provider 130. Customer service provider 130 may include a customer service agent 131 and a customer service provider system 132 operated by customer service agent 131. Server system 110 may be connected to user device 120 and customer service agent system 132 over a communication network 140. Network 140 may be one or a combination of public networks (e.g., the Internet), local networks, and/or other networks.

Server system 110 may be a computer system that includes one or more processors configured to perform various functionalities attributed thereto in this disclosure. Server system 110 may service a functionality accessible on user device 120. For example, server system 110 may generate application data (e.g., application data 250 shown in FIG. 2) enabling user device 120 to provide the functionality so it may be used by user 121. For example, the functionality to be used by user 121 may be the display of content 150 on user device 120, in which case the application data may include or otherwise describe the content 150 that is to be presented on the display. Server system 110 may transmit the application data to user device 120 over network 140.

Server system 110 may be operated by any entity, organization or institution, and the aforementioned functionality serviced by server system 110 may be any functionality without limitation to a particular industry or field of use. For example, server system 110 may be operated by a financial services institution (e.g., a bank), and may provide an online banking service that is accessible on user device 120 using an application executed on the user device 120. Such application may be, for example, a mobile banking application, which may be a web application that runs in a web browser or an application that is installed on the user device 120. The online banking service may permit user 121 to manage a financial account of the user 121. In providing such a service, server system 110 may transmit application data that includes financial information to be displayed on user device 120, such as transactions of the financial account.

Server system 110 may be any suitable computer system. In some embodiments, server system 110 may have a cloud computing platform with scalable resources for computations and/or data storage, and may run one or more applications on the cloud computing platform to perform the functionalities of the server system 110. However, it is understood that the present disclosure is not limited to cloud-computing implementations for server system 110.

User device 120 may be any suitable computer system. For example, user device 120 may be a mobile computing device such as a smartphone, or tablet computer, a personal computer such as a laptop or desktop computer, or a wearable computing device. In FIG. 1, user device 120 is illustrated as a smartphone for illustrative purposes only, but it is understood that the methodologies of the present disclosure do not depend on a particular type of user device.

User device 120 may include one or more output devices 124, such as a display and/or audio speakers, to present content 150 to user 121. User device 120 may further include one or more detectors 126 configured to detect a characteristic of image data of the user 121 during usage of the functionality serviced by the server system 110. Detector(s) 126 may include a camera (e.g., camera 226 in FIG. 2) used to record image and/or video data of the user 121, and a microphone configured to record audio data of the user 121. The camera may record the image portion of video data, which may be generated by user device 120 so as to further include audio data recorded by the microphone. Data recorded by detector(s) 126, such as the image and/or video data, may serve as the basis for user feedback data (e.g., user feedback data 260 of FIG. 2) that is generated by user device 120 and transmitted to server system 110 over network 140. Server system 110 may then utilize this information to determine the reaction of user 121 to content 150 included in the application data.

Although one user device 120 is shown for the system environment 100 of FIG. 1, it is understood that system environment 100 may include a plurality of user devices that each interact with the server system 110 in the manner described herein for user device 120.

Customer service provider 130 may be any element that includes customer service agent 131 and customer service provider system 132. For example, customer service provider 130 may be a call center, a customer support center, a customer support department within an organization, or other organizational unit that includes agents that provide customer service to users, such as user 121. In some embodiments, the customer service provided by customer service provider 130 may relate to the functionality accessible at user device 120 that is serviced by server system 110. Continuing with the aforementioned example in which the server system 110 is operated by a financial services institution, customer service provider 130 may provide customer service pertaining to financial services (e.g., bank accounts, credit card accounts, etc.) offered by the financial services institution and customer service pertaining to features of the mobile banking application used to access online services offered by the financial services institution. Customer service provider 130 may be part of the financial services institution, or a separate entity that provides call center services for the financial services institution.

Customer service agent 131 may be a person that communicates with user 121 through the server system 110 while operating customer service provider system 132. For example, server system 110 may be configured to initiate a customer support chat session enabling user 121 to communicate with customer service agent 131 via text messaging. During the chat session, customer service agent 131 may input a text message through customer service provider system 132 so that the text message is transmitted to the user 121 via server system 110. Customer service agent 131 may also receive text messages input into user device 120 by the user 121 and conveyed to customer service provider system 132 through server system 110. Customer service agent 131 may also be referred to as a customer service representative, or a support agent. Customer service provider system 132 may be any suitable computer system.

Figure 2:
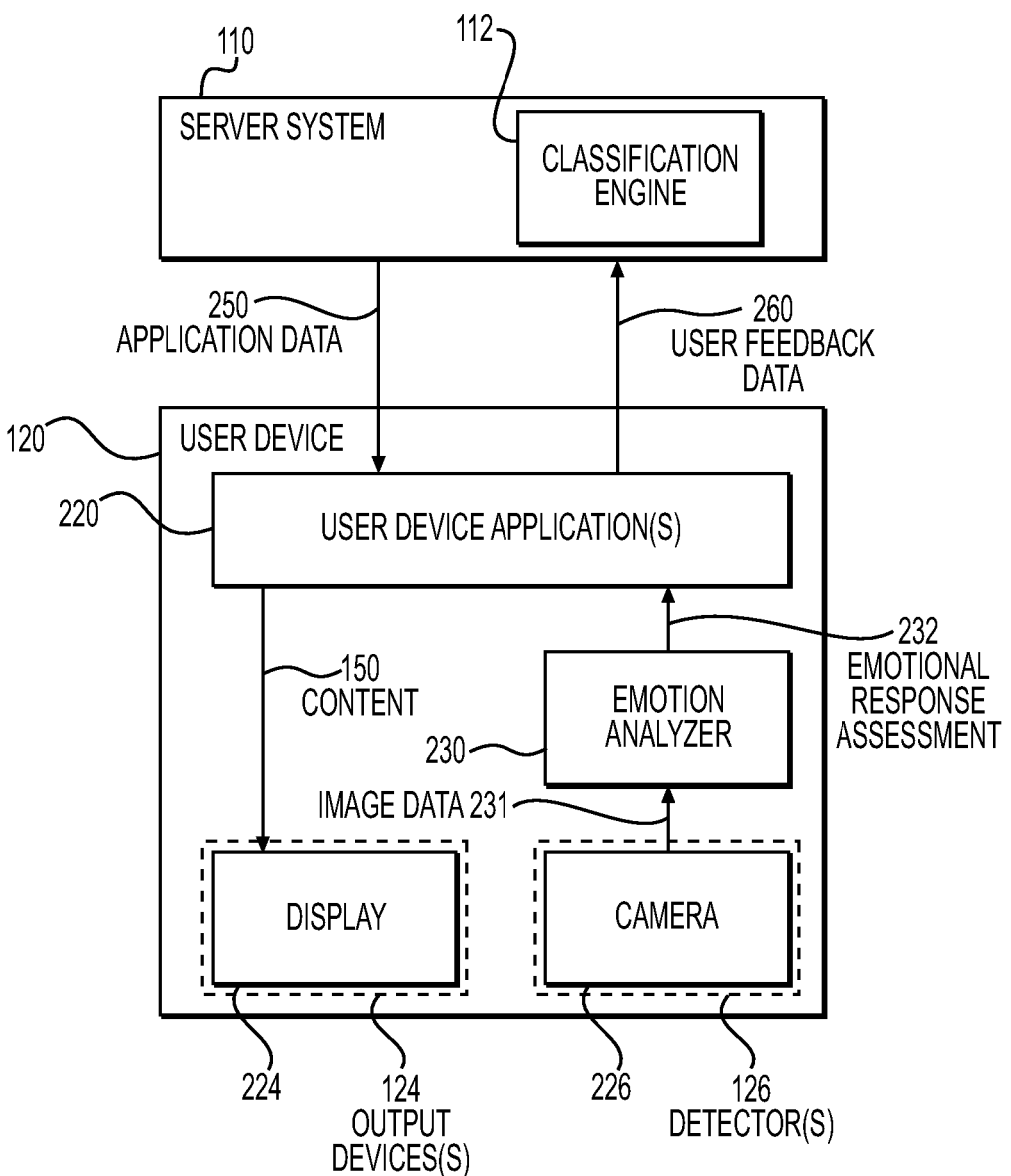
FIG. 2 is a block diagram depicting data flow between components depicted in the system environment of FIG. 1, according to one or more embodiments.

FIG. 2 is a block diagram illustrating an example of data flow between server system 110 and user device 120. Server system 110 may execute one or more server-side applications that generate application data 250 to be transmitted to user device 120 over network 140 to service a functionality accessible by the user 121 at user device 120.

The functionality serviced by server system 110 may include web application services, such as the accessing of information stored on server system 110 (e.g., for display on user device 120). In some embodiments, the functionality serviced by server system 110 may include the presentation of content 150 at the user device 120, in which case the application data 250 generated by the server system 110 may describe the content 150. Application data 250 may describe the content 150 by including the content or by including a description of the content permitting the content 150 to be rendered or generated at the user device 120. Content 150 may include, for example, data, text, images, videos, and/or audio content. Content 150 may be static content, or dynamically changing content that is updated in a continuous stream. Content 150 may be presented to the user in any suitable manner. For example, user device 120 may display content 150 on display 224, as shown in FIG. 2. Alternatively or additionally, user device 120 may output audio content on another output device 124, such as a speaker. In some embodiments, application data 250 may include session data. For example, if the functionality is an online banking functionality, the application data 250 may include a session token.

Application data 250 may be transmitted from server system 110 to user device 120 under any suitable context, such as when the user device 120 has transmitted a request to the server system 110 (e.g., a successful login to an account serviced by server system 110), or when the server system 110 detects an event causing it to transmit information to user device 120.

The application data 250 may have any suitable data format that is usable by user device 120 to provide the functionality serviced by server system 110. User device 120 may execute one or more user device applications 220 that use the application data 250. User device application(s) 220 may include, for example, a web browser, a web application executed in a web browser (such as an online banking portal), and/or any application particularly designed to interface with server system 110 (such as the aforementioned mobile banking application). User device application(s) 220 may include any application that presents content 150 to the user 121 based on application data 250 received from server system 110.

In the example in which the user device application(s) 220 is a mobile banking application, the mobile banking application may display information received from server system 110, such as account balances, payment transactions, and/or other account information of a financial account of the user 121, a credit score of the user 121, and/or credit card rewards available to the user 121. Server system 110 may provide information for graphical user interfaces displayed on display 224. For example, the user device 120 may display an interface for transfer of payments to other accounts. Such an interface may be generated based on information included in the application data 250, such as the current account balance, or a list of destination accounts for payment transfer.

User device application(s) 220 may have a customer service agent interaction feature permitting the user 121 to interact with customer service agent 131 on matters such as management of financial accounts. Such interaction may be text-based messaging, in which case the application data 250 received from server system 110 may include chat messages sent from customer service agent 131 to user 121. A session in which user 121 and customer service agent 131 may interact through text messaging may also be referred to as a chat session. Such a chat session may be implemented via server system 110, and may utilize any method or technology for relaying chat messages between user device 120 and customer service provider system 132.

While online banking is provided in this disclosure as an exemplary application, it is understood that the one or more user device applications 220 may be other types of applications, such as a social media application, a news or information outlet application, a video game application, an entertainment application, or a shopping application. For example, in the case of a shopping application, the server system 110 may provide application data 250 indicative of a list of inventory items to be displayed on display 224 as content 150.

The one or more detectors 126 may record data indicative of a characteristic of user 121 during the user 121's usage of the functionality serviced by the server system 110. For example, as shown in FIG. 2, detector(s) 126 may include a camera 226 that captures image data of 231 of the user 121 during the user 121's usage of the functionality serviced by the server system 110. Camera 226 may be any suitable camera. For example, if the user device 120 is a smartphone or tablet, camera 226 may be a front-facing camera that faces user 121 when the user 121 is viewing a display 224 of the user device 120. If the user device 120 is a desktop computer, camera 226 may be, for example, a webcam of the computer.

User device application(s) 220 may be configured to control camera 226 for purposes of detecting user emotions, including the turning on and off of camera 226 for such purposes. User device application(s) 220 may have a user-configurable setting as to whether use of camera 226 for user emotion detection is permitted or not. If user device application(s) 220 does have permission to access camera 226 for user emotion detection, client application 220 may control camera 226 to engage in user emotion detection in response to the occurrence of a trigger condition. Such a trigger condition may be, for example, the use or activation of a functionality of the user device application(s) 220 or the receipt of a message from server system 110, or receipt of a command from the server system 110.

In some examples, user device application(s) 220 may control camera 226 to engage in user emotion detection when the user 121 has, or is about to, engage in interaction (e.g., a chat session permitting text messaging interaction) with an agent of a call center, such as customer service agent 131. In such examples, the trigger condition may be the initiation of the interaction by the user 121 (e.g., transmission of a request to server system 110 to initiate the chat session), or the receipt of a request to initiate user emotion detection that is input by customer service agent 131 and transmitted to user device application(s) 220 via server system 110, or a command input by user 121. The command input by user 121 may be in response to customer service agent 131's request to initiate user emotion detection. For example, user 121 may be prompted as to whether to permit user emotion detection using camera 226, and may input a command to indicate that user emotion detection is permitted. However, it is also envisioned that the command input by user 121 may be a standalone command that is not necessarily a response prompted by another interaction. In some embodiments, whether user device application(s) 220 are permitted to utilize camera 226 at all and/or to seek permission from user 121 to utilize camera 226, may be a user-configurable setting of user device application(s) 220.

Image data 231 may include images and/or video frames of the user 121 at any suitable timeframe or point in time permitting an emotional response of the user 121 to be discerned. The images and/or video frames of the user 121 may be taken concurrently with display of the content 150. It is also possible for image data 231 to include images and/or video frames taken at a time prior (e.g., immediately prior) to the display of the content 150, which may permit the user 121's reaction to the display of the content 150 to be more discernable.

User device 120 may include an emotion analyzer 230 configured to analyze the image data 231 to determine an emotional response assessment 232. Emotion analyzer 230 may be an application or software component configured to perform facial expression recognition (FER) on the image data 231 to determine the emotional response assessment 232.

Emotional response assessment 232 may include values of one or more emotion parameters. An emotion parameter may be, for example, a parameter representing the degree to which a person exhibits a certain emotion or emotional characteristic. Examples of emotions include happiness, surprise, anger, disgust, fear sadness, satisfaction, and dissatisfaction. An emotion parameter may have a range or set of possible values. Additionally, if an emotion (e.g., happiness) represented by an emotion parameter has an opposite emotion (e.g., sadness), the emotion parameter may also represent that opposite emotion. For example, an emotion parameter may be a happy/sad parameter having a range of values from 0 to 1, with 1 corresponding to an assessment of "very happy" and 0 corresponding to an assessment of "very sad." It is noted that this range of 0 to 1 is exemplary, and that other ranges or sets of values may be used. For example, it is also possible to use a negative value to represent "sad," a positive value to represent "happy," and a value of 0 to represent "neutral." It is also possible for the range to be from 1 to 5, where 1 represents "very sad," 2 represents "somewhat dissatisfied," 3 represents "neutral," 4 represents "somewhat happy," and "5 represents very happy." In the above examples, "sad" and/or "happy" may be replaced with "dissatisfied" and/or "satisfied," respectively. That is, the happy/sad parameter described above may instead be a dissatisfied/satisfied parameter. The values of the one or more emotion parameters may be transmitted to the server system 110 as part of the user feedback data 260.

Emotion analyzer 230 may be separate from user device application(s) 220, particularly those user device application(s) 220 that interact with the server system 110. For example, the emotion analyzer 230 may be an augmented reality platform, such as ARKit by Apple Inc.'s or ARCore by Google. In such implementations, the user device application(s) 220 may obtain the emotional response assessment 232 from an application programming interface (API) of the emotion analyzer 230. However, it is also possible for the emotion analyzer 230 to be a functionality of user device application(s) 220. For example, the aforementioned mobile banking application may have its own built-in facial expression recognition model.

As noted above, user device application(s) 220 may transmit the emotional response assessment 232 to the server system 110 as part of user feedback data 260. In addition to including the emotional response assessment 232, user feedback data 260 may further include data correlating the emotional response assessment 232 to the content 150 that elicited the emotional response indicated in the emotional response assessment 232.

For example, the data correlating the emotional response assessment 232 to the content 150 may include information indicative of a content 150 that was being presented to the user 121 and/or a state of the user device application(s) 220. Such information may include, for example, description(s) and/or identifier(s) of the content 150 (e.g., a recent payment history of a certain credit card account of the user 121) or type of content 150 that was presented to the user 121, or a description of the state of the user device application(s) 220. The description or identifier may permit server system 110 to determine a particular content 150 that had elicited the emotional response. Information indicative of content 150 presented to the user 121 may be generated by user device application(s) 220 based on user interactions performed on user device application(s) 220, such as navigation between pages or the use of functionalities of the user device application(s) 220. Alternatively or additionally, the data correlating the emotional response assessment 232 to the content 150 may include a screenshot of display 224, which is an example of information indicative of content 150 being displayed at a certain point in time.

In some examples, the emotional response assessment 232 may include a time index for values of one or more emotion parameters. The time index may be used to correlate values of the emotional response assessment with content 150 presented to the user 121 by user device 120 and/or a state of the user device application(s) 220. For example, the values of the aforementioned happy/sad parameter may be time-indexed so as to include values over a period of time within which a certain content 150 was presented, wherein different values correspond to different points in time. In such examples, the user feedback data 260 may additionally specify the time(s) at which certain content 150 was presented to the user 121.

As noted above, camera 226 may capture image data 231 of user 121 prior to the presentation of the content 150. Accordingly, the values of the one or more emotion parameters may include value(s) before and value(s) after the start of the presentation of the content 150 to user 121. When such values are transmitted to the server system 110 as part of user feedback data 260, server system 110 may discern that changes in the values before and after the onset of the presentation of the content resulted from the presentation of the content.

Transmission of user feedback data 260 from user device 120 to server system 110 may be conducted be in any suitable manner, such as a continuous data stream or a one-time transmission. In the case of a continuous data stream, user device 120 may provide emotional response assessment 232 in real-time (e.g., real-time values of one or more emotion parameters), and server system 110 may correlate the emotional response assessment 232 with the content 150 being presented on the user device 120.

For purposes of privacy protection, user feedback data 260 may omit image data 231. That is, the server system 110 may, instead of receiving images (e.g., still images or video frames) of user 121 that were captured by camera 226, receive only a representation of user 121's reaction, in the form of numerical values of one or more emotion parameters. Accordingly, image data 231 captured by camera 226 may remain private to user 121.

Server system 110 may analyze user feedback data 260 using a classification engine 112. The classification engine 112 may be a machine learning model, such as a deep neural network, that is configured to determine an output as a function of an input. Server system 110 may construct the input to include values included in the user feedback data 260 and/or other values used by the classification engine 112.

The input data may be an input vector that includes the values of the one or more emotion parameters, and values indicative of content 150 presented to user 121. For example, the values indicative of content 150 presented to user 121 may indicate that one or more content 150 that was displayed on display 224 during a certain period of time (e.g., a certain financial transaction that was displayed at a particular time), and the values of one or more emotion parameters may include value(s) indicating that the user 121 was happy during certain times within the aforementioned period of time, and value(s) indicating that the user was sad during other times within the aforementioned period of time.

Based on the input data, classification engine 112 may generate an assessment based on the user feedback data 260 and may determine one or more actions to be taken based on the assessment. In some embodiments, classification engine 112 may assess, based on the aforementioned input vector, that user 121 has exhibited a certain emotion, and may then determine that customer service agent 131 should be made aware of the emotion. Additionally or alternatively, classification engine 112 may correlate emotions of the user 121 with content 150 presented to the user 121 at the user device 120.

For example, classification engine 112 may determine an assessment that the user 121 exhibited an emotion to a certain extent (e.g., an emotion parameter of "upset" having a certain value) and may further determine that, based on such exhibition of emotion (e.g., the value of the emotion parameter satisfying a certain threshold), customer service agent 131 should be notified. Upon such a determination, server system 110 may transmit a message to customer service provider system 132 indicating that the user 121 has exhibited the emotion. This message may also correlate the emotion with the content 150 presented to the user 121 that was determined by the classification engine 112 to have elicited the emotion, wherein such correlation may be part of the output determined by classification engine 112. For example, the message transmitted to customer service provider 132 may indicate that the user 112 was sad at the time when the aforementioned financial transaction was displayed on user device 120.

In general, outputs and other determinations of classification engine 112 may be output and stored in a memory of server system 110. Such outputs and other determinations may be organized into the form of a report.

FIG. 3 is a flowchart illustrating a computer-implemented method for providing user emotion information to a customer service provider. The method may be performed by any suitable computer system, such as server system 110.

Step 301 may include initiating a chat session enabling a user (e.g., user 121) to communicate with a customer service provider (e.g., customer service provider 130) via text messaging. In this context, customer service provider 130 may represent customer service agent 131 and/or customer service provider system 132. The act of initiating a chat session may also be referred to as an act of opening a chat session.

The initiation of the chat session may include any processes executed to enable communication between user 121 and customer service provider 130. For example, server system 110 may execute a process that detects any messages received from user device 120 and relays the received messages to customer service provider 130, and vice versa. The chat session may be implemented using any suitable method and/or protocol. In some embodiments, the user device application(s) 220, such as a mobile banking application, may provide an interface by which user 121 may enter text messages to be communicated to customer service provider 130 and receive text messages communicated from customer service provider 130.

Step 302 may include transmitting, to a user device (e.g., user device 120), over a communication network (e.g., communication network 140), application data (e.g., application data 250) enabling the user device 120 to perform a functionality. The application data in step 302 may have any of the characteristics described in this disclosure for application data 250 shown in FIG. 2. For example, the application data 250 may describe a content 150 to be displayed on a display 224 of the user device 120, and the functionality may include display of the content 150 on the display 224 so that the content 150 is presented to user 121. In some embodiments, content 150 may include information of a financial account of user 121, as described above.

Step 303 may include receiving, from the user device 120 over the communication network 140, user feedback data (e.g., user feedback data 260) indicative of a characteristic of image data (e.g., image data 231) of the user 121 obtained by a camera (e.g., camera 226) of the user device 120 during usage of the functionality by the user 121. The user feedback data 260 in step 303 may be generated by user device 120 in accordance with the techniques described in this disclosure, including the techniques described in connection with FIG. 2.

For example, the user feedback data 260 may include a value of a facial expression parameter. The facial expression parameter may be associated with a certain emotion that is discernable from facial image data, and the value for the facial expression parameter may be indicative of (e.g., be a representation of) a degree to which a user expresses that certain emotion. The value of the facial expression parameter may be a numerical value within a certain range, such as a range of 0 to 1, wherein one endpoint of the range corresponds to a higher intensity of an emotion represented by the facial expression parameter and the other endpoint of the range corresponds to a lower intensity of the emotion. The value of the facial expression parameter may correspond to a point in time during a period that includes the usage of the functionality. For example, the value may be time-indexed such that the value is associated with a point in time.

In some embodiments, the user feedback data 260 may be received in real-time via a data stream transmitted from user device 120 during the chat session. In such embodiments, step 303 may include receiving time-indexed values of the facial expression parameter in real-time during the chat session, wherein the plurality of numerical time-indexed values of the facial expression parameter are respectively associated with different points in time during a period that includes the usage of the functionality, and each of the time-indexed values is indicative of a degree to which the user expresses the emotion at a respective point in time.

Additionally, the application data 250 transmitted in step 302 may enable an application executed on user device 120, such as user device application 220, to provide the functionality to the user. The user feedback data received in step 303 may be indicative of a state of the user device application 220 at one or more of the different points in time.

Step 304 may include inputting the user feedback data 260 into a machine learning model to determine an assessment of an emotional state of the user 121 during the usage of the functionality. The machine learning model may be or include the classification engine 112 as described above in connection with FIG. 2. The assessment of the emotional state may indicate an emotion exhibited by the user 121 in response to viewing the content 150.

Step 305 may include providing (e.g., transmitting over network 140) the assessment to customer service provider 130. Step 305 may be performed during the chat session, such that the customer service provider 130 is able to assist user 121.

In embodiments in which user feedback data 260 is received in real-time, the time-indexed values of the facial expression parameter may be inputted into the machine learning model to determine a real-time assessment of the emotional state of the user 121. Additionally, the real-time assessment may be provided to the customer service provider 130 in real-time.

It is noted that step 301 may take place prior to step 302 but such is not a requirement. Step 301 may take place at any point prior to step 305. If step 301 takes place after step 302, then the user feedback data received in step 303 may pertain to a state of the user 121 prior to the user 121's request for initiating the chat session. Furthermore, the method of FIG. 3 may include additional steps or aspects. For example, the method may further include notifying the customer service provider 130 of a task escalation, based on a task escalation determined by the machine learning model.

FIG. 4 is a flowchart illustrating another computer-implemented method for providing user emotion information to a customer service provider. The method may be performed by any suitable computer system, such as user device 120. In some embodiments, user device 120 may store user device application(s) 220 in the form of instructions that, when executed by one or more processors of user device 120, cause or otherwise configure user device 120 to perform the method illustrated in FIG. 4.

Step 401 may include transmitting, to a server system (e.g., server system 110) over a communication network (e.g., network 140), a request to initiate a chat session enabling a user of the user device 120 to communicate with a customer service provider (e.g., customer service provider 130) via text messaging. For example, the request may be recognized by server system 110 as a request to execute a process that detects any messages received from user device 120 and relays the received messages to customer service provider 130, and vice versa.

Step 402 may include receiving, from the server system 110, application data (e.g., application data 250) enabling the user device 120 to perform a functionality. The application data in step 402 may have any of the characteristics described in this disclosure for application data 250 shown in FIG. 2.

Step 403 may include controlling a camera (e.g., camera 226) of the user device 120 to record image data (e.g., image data 231) of the user 121. Step 403 may involve any of the techniques described in this disclosure pertaining to operation of camera 226, including the techniques described in connection with FIG. 2. For example the user device 120 may determine that the user has provided permission to permit the camera 226 to record image data 231. Such determination may include determining that the user 121 has enabled a setting that provides such permission, and/or prompting the user for such permission and receiving an input from the user 121 indicative of the permission to permit camera 226 to record image data 231.

Step 404 may include analyzing the image data 231 to determine a characteristic of the user 121 during the usage of the functionality. The analysis may be performed by emotion analyzer 230 and/or user device application(s) 220 and may be performed as described in connection with FIG. 2.

Step 405 may include providing, to server system 110 over the communication network 140, user feedback data (e.g., user feedback data 260) indicative of the characteristic of the user 121 observed by the camera 226 during the usage of the functionality. User feedback data 260 may be generated by user device 120 in accordance with the techniques described in this disclosure, including the techniques described in connection with FIG. 2. For example, user feedback data 260 may include a value of a facial expression parameter, the value being indicative of a degree to which the user expresses an emotion associated with the facial expression parameter. Additionally, the user feedback data may be provided to the server system 110 in real-time via a data stream.

It is noted that step 401 may take place prior to step 402 but such is not a requirement. Step 401 may take place at any point prior to step 405. If step 401 takes place after step 402, then the user feedback data provided in step 405 may pertain to a state of the user 121 prior to the request for initiating the chat session.

Figure 5:
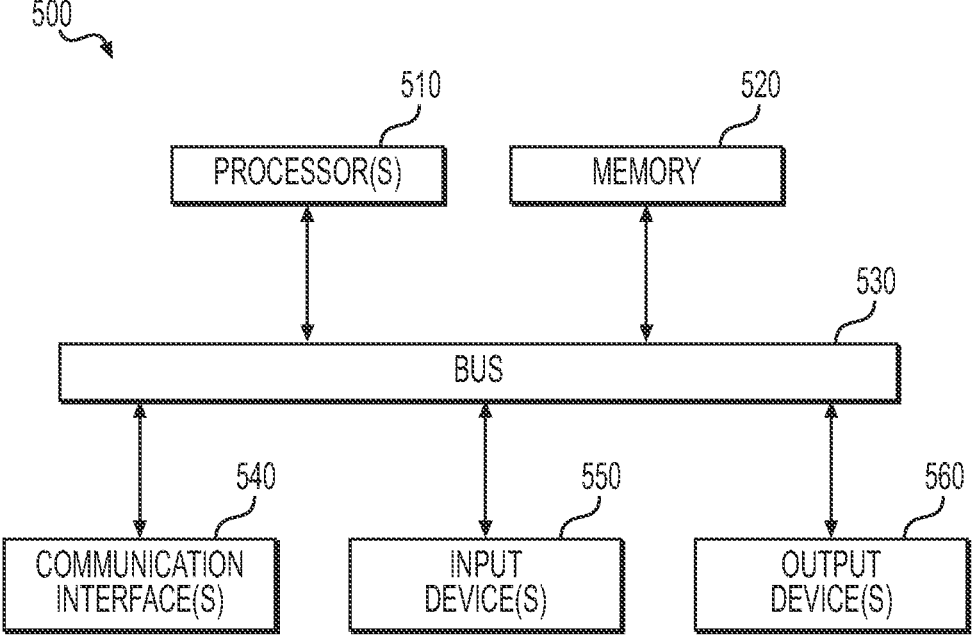
FIG. 5 depicts an exemplary computing device, according to one or more embodiments.

The methods illustrated by FIGS. 4 and 5 may collectively constitute a client-server interaction between user device 120 and server system 110. For example, user device 120 may perform step 401, and server system 110 may perform step 301 in response to receiving the request transmitted in accordance with step 401. The application data 250 transmitted by server system 110 may be the application data 250 received by user device 120 in step 402. The user feedback data 260 transmitted by user device 120 in step 405 may be the user feedback data 260 received by server system 110 in step 303.

As described above, server system 110 is able to obtain information pertaining to the emotions of a user 112, such as the assessment of the emotional state of a user 112 described above. Based on such information, a customer service provider 130 may be able to assess the emotions of user 121 more easily, even if the customer service provider 130 is communicating with the user 121 by text messaging, and not communicating with the user in-person or by voice. By being able to assess the emotions of user 121 more easily, customer service provider 130 may be able to provide customer service more effectively.

In general, any process discussed in this disclosure that is understood to be computer-implementable, such as the process shown in FIG. 2 and the processes described in connection with FIGS. 3-4, may be performed by one or more processors of a computer system, such as server system 110 and/or user device 120, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as server system 110, user device 120, and customer service provider system 132, may include one or more computing devices. If the one or more processors of the computer system is implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

FIG. 5 illustrates an example of a computing device 500 of a computer system. The computing device 500 may include processor(s) 510 (e.g., CPU, GPU, or other processing unit), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more busses. In some embodiments, the processor(s) 510 of the computing device 500 includes both a CPU and a GPU.

Computing device 500, if implemented as user device 120 or as part of user device 120, may include output device(s) 124, detector(s) 126, and any other features described above for user device 120.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for providing an online service to a user device and user emotion information to a customer service provider, the method comprising:

receiving a request to access the online service from the user device, the online service being configured to provide access to information of an account of a user of the user device via a web application or mobile application executed on the user device;

establishing, over a communication network, a data connection with the user device enabling the web application or mobile application executed on the user device to access the online service;

providing the information of the account to the user device so that the information of the account is displayed on a display of the user device during usage of the online service by the user;

transmitting, to the user device over the communication network, a command to control a camera of the user device enabling the user device to perform user emotion detection;

receiving, from the user device over the communication network, user feedback data generated at the user device indicative of a characteristic of image data of the user obtained by the camera disposed on the user device upon execution of the web application or mobile application on the user device to access the online service by the user, the user feedback data including a value of a facial expression parameter, the value being indicative of a degree to which the user expresses an emotion associated with the facial expression parameter;

inputting the value into a machine learning model to determine an assessment of an emotional state of the user during the usage of the online service, the assessment being indicative of an emotion exhibited by the user in response to viewing the information of the account displayed on the user device; and providing the assessment to a customer service provider.

2. The method of claim 1, wherein the method further includes receiving, from the user device over the communication network, a request to initiate a chat session, and the initiating the chat session is performed in response to receiving the request to initiate the chat session.

3. The method of claim 1, wherein the user feedback data is received in real-time via a data stream transmitted from the user device during a chat session.

4. The method of claim 3, wherein the receiving the user feedback data includes receiving time-indexed values of a facial expression parameter in real-time during the chat session, the time-indexed values are respectively associated with different points in time during a period that includes the usage of a functionality, and each of the time-indexed values is indicative of a degree to which the user expresses the emotion at a respective point in time.

5. The method of claim 4, wherein the user feedback data is indicative of a state of the web application or mobile application at one or more of the different points in time.

6. The method of claim 4, wherein the time-indexed values of the facial expression parameter are inputted into the machine learning model to determine a real-time assessment of the emotional state of the user, and the real-time assessment is provided to the customer service provider in real-time.

7. The method of claim 1, wherein the application data describes a content to be displayed on a display of the user device, and a functionality includes displaying the content on the display so that the content is presented to the user.

8. The method of claim 7, wherein the content includes information of an account of the user.

9. The method of claim 7, wherein the assessment of the emotional state indicates an emotion exhibited by the user in response to viewing the content.

10. The method of claim 1, further comprising:

inputting the user feedback data into the machine learning model further determines a task escalation for the customer service provider, and the method further comprises notifying the customer service provider of the task escalation.

11. A non-transitory computer-readable medium storing instructions that, when executed by one or more processors, cause the one or more processors to perform operations including:

receiving, from a user device, a request to use an online service, the online service being configured to provide access to information of an account of a user of the user device;

establishing, over a communication network, a data connection with the user device enabling an application executed on the user device to use the online service;

providing the information of the account to the user device so that the information of the account is displayed on a display of the user device during usage of the online service by the user;

transmitting, to the user device over the communication network, a command to control a camera of the user device enabling the user device to perform user emotion detection;

receiving, from the user device over the communication network, user feedback data generated at the user device indicative of a characteristic of image data of the user obtained by the camera of the user device upon execution of the application on the user device to access the online service by the user, the user feedback data including a value of a facial expression parameter, the value being indicative of a degree to which the user expresses an emotion associated with the facial expression parameter;

inputting the value into a machine learning model to determine an assessment of an emotional state of the user during the usage of the online service, the assessment being indicative of an emotion exhibited by the user in response to viewing the information of the account displayed on the user device; and providing the assessment to a customer service provider.

12. The non-transitory computer-readable medium of claim 11, wherein the operations further include:

determining that the user has provided a permission to permit the camera to record the image data.

13. The non-transitory computer-readable medium of claim 12, wherein the determining that the user has provided a permission includes:

prompting the user to provide the permission; and
  receiving an input from the user indicative of the permission.

14. The non-transitory computer-readable medium of claim 11, wherein the user feedback data is provided in real-time via a data stream.

15. The non-transitory computer-readable medium of claim 14, wherein the providing the user feedback data includes providing time-indexed values of a facial expression parameter in real-time during a chat session,
  the time-indexed values are respectively associated with different points in time during a period that includes the usage of a functionality, and
  each of the time-indexed values is indicative of a degree to which the user expresses the emotion at a respective point in time.

16. The non-transitory computer-readable medium of claim 15, wherein the application data enables an application of the user device to provide the functionality to the user, and
  the user feedback data is indicative of a state of the application at one or more of the different points in time.

17. The non-transitory computer-readable medium of claim 11, wherein the application data describes a content to be displayed on a display of the user device, and
  a functionality includes displaying the content on the display so that the content is presented to the user.

18. The non-transitory computer-readable medium of claim 17, wherein the content includes information of an account of the user.

19. The non-transitory computer-readable medium of claim 17, wherein the user feedback data is indicative of a change in the characteristic of the user in response to viewing the content.

20. A computer system for providing an online service to a user device including a camera, and for providing user emotion information to a customer service provider, the computer system comprising:

a memory storing instructions; and
  one or more processors configured to execute the instructions to perform operations including:

receiving, from the user device, a request to use the online service, the online service being configured to provide access to information of an account of a user of the user device;
    establishing, over a communication network, a data connection with the user device enabling an application executed on the user device to use the online service provided by the computer system;
    providing the information of the account to the user device so that the information of the account is displayed on a display of the user device during usage of the online service by the user;
    transmitting, to the user device over the communication network, a command to control the camera of the user device enabling the user device to perform user emotion detection;
    receiving, from the user device over the communication network, user feedback data generated at the user device indicative of a characteristic of image data of the user obtained by the camera of the user device upon execution of the application on the user device to access online service by the user, the user feedback data including a value of a facial expression parameter, the value being indicative of a degree to which the user expresses an emotion associated with the facial expression parameter;
  inputting the value into a machine learning model to determine an assessment of an emotional state of the user during the usage of the online service, the assessment being indicative of an emotion exhibited by the user in response to viewing the information of the account displayed on the user device; and
  providing the assessment to a customer service provider.

\* \* \* \* \*